United States Patent [19]

Kawamura et al.

[11] Patent Number: 5,122,709
[45] Date of Patent: Jun. 16, 1992

[54] ANTISTATIC CATHODE RAY TUBE WITH LOBE LIKE PROJECTIONS AND HIGH GLOSS AND HARDNESS

[75] Inventors: Takao Kawamura, Chiba; Hiromitsu Kawamura; Katsumi Kobara, both of Mobara, all of Japan

[73] Assignee: Hitachi, Ltd., Tokyo, Japan

[21] Appl. No.: 475,203

[22] Filed: Feb. 5, 1990

[30] Foreign Application Priority Data

Mar. 20, 1989 [JP] Japan .................. 1-066275
Jun. 19, 1989 [JP] Japan .................. 1-154565
Jun. 19, 1989 [JP] Japan .................. 1-154566

[51] Int. Cl.⁵ .................................... H01J 9/88
[52] U.S. Cl. ...................... 313/479; 313/466; 313/478
[58] Field of Search ............ 313/466, 469, 473, 474, 313/478, 479; 427/108; 350/164

[56] References Cited

U.S. PATENT DOCUMENTS

| | | | |
|---|---|---|---|
| 4,590,117 | 5/1986 | Taniguchi et al. | 350/164 |
| 4,723,091 | 2/1988 | Kawamura et al. | 313/478 |
| 4,755,716 | 7/1988 | Hayafune et al. | 313/478 |
| 4,839,736 | 6/1989 | Sugihara et al. | 313/478 |
| 4,873,120 | 10/1989 | Itov et al. | 427/108 |
| 4,900,984 | 2/1990 | Itov et al. | 313/479 |
| 4,945,282 | 7/1990 | Kawamura et al. | 313/479 |

Primary Examiner—Donald J. Yusko
Assistant Examiner—John Giust
Attorney, Agent, or Firm—Antonelli, Terry, Stout and Kraus

[57] ABSTRACT

Disclosed in this invention are a cathode ray tube, especially glare type one, characterized in that a two-layer composite film consisting of a transparent electroconductive film and a protective film formed thereon is coated on the front panel so that surface glossiness thereof as measured by JIS Z-8741 Method 2 will become 80% or above, and a process for producing the cathode ray tube.

4 Claims, 3 Drawing Sheets

ANTISTATIC CATHODE RAY TUBE WITH LOBE LIKE PROJECTIONS AND HIGH GLOSS AND HARDNESS

BACKGROUND OF THE INVENTION

1. Field of the Invention

This invention relates to an antistatic cathode ray tube having the effect of preventing electric charging by static induction on the front panel, and having a high degree of glossiness, excellent resolution and contrast characteristics, and high scratch resistance.

2. Related Art

When a cathode ray tube is set in a television receiver and operated, the front panel surface of the tube is electrically charged due to static induction which is caused by switching on and off of power or application of high voltage in the operation. This static electricity attracts dust and other contaminants in the air and collects them on the panel surface to foul it, making it difficult to view the picture images displayed on the screen. Also, when a person touches the panel surface, he may have an unpleasant feeling or a slight shock by discharge of static electricity.

As a method for preventing such static charging of the front panel of cathode ray tube, it has been proposed to provide a transparent electroconductive film layer on the external surface of the panel (see, for instance, Japanese Patent Application Kokai (Laid-Open) No. 16452/86, 124331/88 and 160140/88). Various methods have been proposed for forming a transparent electroconductive film layer of this type. According to one method, a solution containing an electroconductive material is spray-coated on the external surface of the panel to provide it with both an anti-glaring effect and an antistatic effect. In another method, a solution containing an electroconductive material is spin-coated or dip-coated on the panel surface.

For example. Japanese Patent Application Kokai (Laid-Open) No. 124331/99 discloses a method according to which a solution prepared by adding one or more of the compounds selected from halides, nitrates and sulfates of Fe, Co, Ni, Ag, Zn, Al and In to a silica sol solution made by using silicon halide, silane alkoxide, silyl isocyanate or the like is spray-coated on the panel surface of a cathode ray tube and then baked. According to this method, the front surface of cathode ray tube is provided with excellent antistatic properties and also has high film strength, but the surface resistivity provided by this treatment is around $19^9 \Omega/\square$ and also glossiness is only about 50%, which leads to low resolution and constrast, so that the thus treated panel surface is impractical where super-fineness of pictures is an important requirement. For instance, it is unsuited for a cathode ray tube for display devices for OA appliances where a glare type panel is required.

A glare type transparent electroconductive film of an anti-static cathode ray tube can be obtained by spin-coating or dip-coating a solution containing an electroconductive material on the panel surface; but in case of using these methods, particular care is needed for ensuring cleanliness of the panel surface because presence of contaminants such as dust on the panel surface at the time of coating causes a serious defect of the coat. Also, even a slight change of coating conditions may cause formation of interference color or non-uniform coloration, resulting in a low yield of products.

As means for increasing the strength of the transparent electroconductive film, a method is known in which a solution prepared by dispersing ultra-fine particles mainly composed of electroconductive particles of tin oxide ($SnO_2$) in an alcoholic solution such as ethyl silicate solution, is coated on the surface of the object to be coated and then baked at a relatively high temperature, or about 500° C., to form a transparent electroconductive coating film. However, use of such a high baking temperature as about 500° C., although capable of providing a film having practically sufficient mechanical and chemical strength, is improper for application to a finished product such as a cathode ray tube or a liquid crystal display element. For a finished product, the baking temperature must not exceed 200° C.

It is, however, impossible to obtain a high film strength with such a low baking temperature. As a solution to this problem, it has been proposed to apply an additional surface protective coating film on the transparent electroconductive film. This protective film is formed by spray coating, and it is quite satisfactory in strength and also has a reflection preventing function.

By forming a surface protective film as described above, it is possible to obtain a high film strength and also the production yield is enhanced; but in this case, too, the panel surface of the cathode ray tube is lowered in glossiness, resulting in reduced resolution and constrast. When it is attempted to raise surface glossiness to around 80% by reducing the spray-coating rate, it becomes impossible to maintain the practical film strength. Also, there is a large possibility of causing formation of interference color or non-uniformity of coloration due to the two-layer structure, and it is also difficult to attain a high-yield production.

In the case of spin-coating where said protective film is formed in a more moist state, although resolution and clearness of image are improved, there occurs a phenomenon of interference between the protective film and the base film to cause coloration.

The tests on glossiness, resolution and film strength by the present inventors have revealed the following facts.

Firstly, the inventors examined the relation between glossiness and resolution according to the Bar-chart method by using a cathode ray tube having a transparent electroconductive layer and a protective film layer formed on said electroconductive layer. The electroconductive layer being formed by spin-coating an alcohol solution of tin oxide ($SnO_2$), antimony oxide ($Sb_2O_3$) and alkyl silicate on the surface of a tinted bulb (transmittance of light with wavelength of 546 nm at 10 mm thickness = 56%) and the protective film layer being formed by spray-coating on the electroconductive layer an alcohol solution of alkyl silicate. The result is shown in FIG. 6. It is seen from the graph of FIG. 6 that glossiness (measured according to JIS Z-8741 Method 2) in the case of providing a transparent electroconductive layer alone (providing no protective layer) is 110% (indicated by a white circle in the graph), which dictates that it is necessary to make glossiness 80% or higher for obtaining a same degree of resolution when providing a protective layer.

FIG. 7 shows the result of examination on the relation between glossiness and pencil scratch hardness (measured according to JIS K-5401) by using the same specimen as employed in the above test. The result of examination depicted in the graph of FIG. 7 shows that when it is attempted to provide the film with a pencil hardness of H or above which is the practical strength of film, glossiness becomes lower than 80%.

OBJECT AND SUMMARY OF THE INVENTION

The present invention, in one aspect thereof, relates to a cathode ray tube having a front panel which is well balanced and excellent in glossiness, resolution and film strength.

In another aspect of the invention, it is intended to provide a cathode ray tube having a front panel which is well balanced and excellent in glossiness, resolution and film strength and further characterized in that surface electric resistance is $10^6$ to $10^{11} \Omega/\square$.

The third aspect of the present invention relates to a process for producing a cathode ray tube having a front panel which is well balanced and excellent in glossiness, resolution and film strength, and has the surface electric resistance of $10^6$ to $10^{11} \Omega/\square$.

Figure 1:
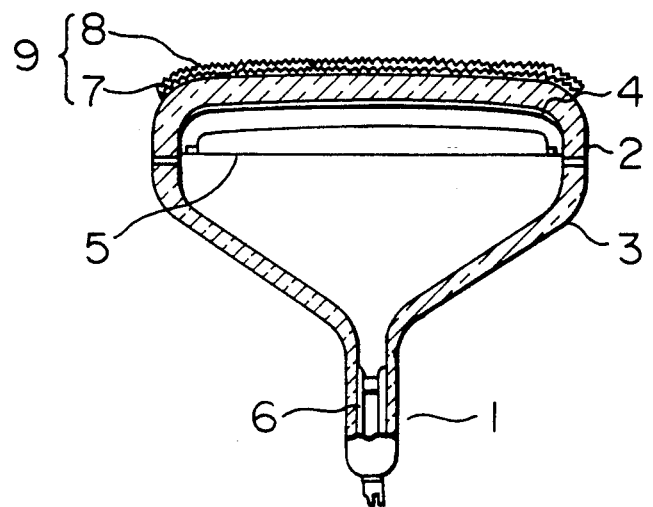
FIG. 1 is a sectional view showing schematically the structure of an antistatic cathode ray tube according to the present invention.

| Legend for figures | |
|---|---|
| 1: cathode ray tube | 2: front panel |
| 3: funnel | 4: fluorescent substance layer |
| 5: shadow mask | 6: electron gun |
| 7: transparent electroconductive film | 8: surface protective film |
| 9: antistactic film | 10: reinforcing band |
| 11: fluorescent light | 12: external light |

DETAILED DESCRIPTION OF PREFERRED EMBODIMENTS

The cathode ray tube of this invention can be obtained by first forming a transparent electroconductive film on the front panel by applying thereon a coating composition comprising one or more of metal oxides selected from tin oxide ($SnO_2$), antimony oxide ($Sb_2O_3$) and indium oxide ($In_2O_3$), a mixed solution of ethanol and isopropanol alkyl silicate, then forming on the transparent electroconductive film a second coat designed to serve as a protective film by applying thereon a coating composition comprising 0.5 to 1.5 wt % of $SiO_2$ derived from an alkyl silicate, 75 to 90 wt % of a solvent mainly composed of ethanol and isopropanol, 2 to 3 wt % in terms of combined amount of a catalyst for hydrolyzing alkyl silicate and water, and 5 to 20 wt % of a drying rate regulator, and then baking the coat at a temperature not exceeding 200° C.

By following the above-described process, there can be obtained a cathode ray tube having a front panel whose surface glossiness measured according to the method of JIS Z-8741 is 80% or above.

It is to be noted especially that a cathode ray tube having a surface resistivity of $10^6$ to $10^{11} \Omega/\square$ and maintaining high resolution and contrast can be obtained by forming a transparent electroconductive film by spray- or spin-coating the surface with a coating solution containing 0.5 to 5 wt % of at least one metal oxide selected from tin oxide, indium oxide and antimony oxide which have electroconductivity in themselves, 0.5 to 2 wt % of silicon oxide derived from alkyl silicate, 60 to 90 wt % of a solvent mainly composed of ethanol and isopropanol, 1 to 15 wt % in terms of the combined amount of a catalyst necessary for hydrolysis and water (hereinafter sometime referred to as a mixture of catalyst and water), and 5 to 20 wt % of a drying rate regulator.

For obtaining a cathode ray tube having a panel surface glossiness (measured according to JIS Z-8741) of 80% or above and high resolution while keeping free from formation of interference color or non-uniformity of coloration due to provision of protective film, it is advisable to adjust the spraying conditions as specified below in forming the protective film:

Coater: externally mixed type air spray coater
Air pressure: 1 to 5 kg/cm$^2$
Ejection rate of coating solution: 0.5 to 5 l/hr
Spray time: 0.5 to 5 minutes (when spraying a 29 inch bulb)

The spray coating operations conducted under above-specified conditions can provide a cathode ray tube having a front panel excellent and balanced in qualities, especially glossiness and resolution. Characteristically, the thus formed front panel has a surface roughness Rz (measured according to JIS B-0601) of 0.01 to 0.2 μm (10-point average roughness), the particle diameter (d in FIG. 5(A)) is 10 to 150 μm, and the number of particles existing within a span of 0.1 mm on the front panel surface is 0.5 to 5 on the average. As for the particle shape which is a decisive factor of surface roughness, it is desirable that the particles have a peripheral lobe-like protuberance or rising, in other words, a partly cut-out spherical projection with a width (corresponding to w in FIG. 5A) of 1 to 50 μm and a height (corresponding to k in FIG. 5A) of 0.01 to 0.5 μm. Of course, the particles may be spherical as a whole as far as they meet the above-said requirements. Spray time may be properly decided by taking into consideration the required frequency of spraying, positional relation between nozzle and object to be sprayed, and nozzle performance.

In the ethanol and isopropanol mixed solution used for forming the transparent electroconductive film, the ethanol to isopropanol ratio (by weight) is preferably 5–20:1. This mixed solution is added in the coating composition in an amount of 60 to 90% by weight.

The alkyl silicate used in forming the transparent electroconductive film is preferably the one having 1 to 4 carbon atoms. Ethyl silicate is especially preferred. The amount of such alkyl silicate used may be properly selected from within the range of 0.5 to 2.0 wt % as solid content of $SiO_2$.

As catalyst, there can be used those which are capable of hydrolyzing alkyl silicate in the presence of water, for example, inorganic acids such as sulfuric acid, hydrochloric acid and nitric acid. The catalyst used in the present invention may be those of technical grade.

The water to catalyst ratio (by weight) is 10-50:1.

The term "drying rate regulator" used in this invention refers to organic solvents which can function for preventing rapid drying to prevent non-uniformity of coating and have a boiling point of 150° C. or higher. Diacetone alcohol and ethyl cellosolve can be mentioned as typical examples of such drying rate regulator.

Coating in the present invention may be accomplished by either spin-coating or spray-coating.

The protective film, which is the second layer of the panel surface coat, can be formed by spray coating with a solution containing 0.5 to 1.5 wt % of $SiO_2$ derived from alkyl silicate, 75 to 90 wt % of a solvent composed of ethanol and isopropanol, 2 to 3 wt % of a mixture of catalyst and water, and 5 to 20 wt % of drying rate regulator.

Needless to say, the solutions used for the first and second coating films are adjusted in drying rate and gelling rate of silicate so that uniform coating can be accomplished over the entire panel surface without affecting glossiness. If necessary, there can be used other material(s) in an appropriate amount.

Final baking of the coat at a temperature of 100 to 200° C. for a period of about 10 to 60 minutes gives a finished cathode ray tube having a coated panel whose surface roughness Rz (10-point average roughness) (measured according to JIS B-0601) is 0.01 to 0.2 μm and in which the particle diameter is 10 to 150 μm and the number of particles existing within a section of 0.1 mm on the front panel surface coating is 0.5 to 5 on the average.

Figure 5A:
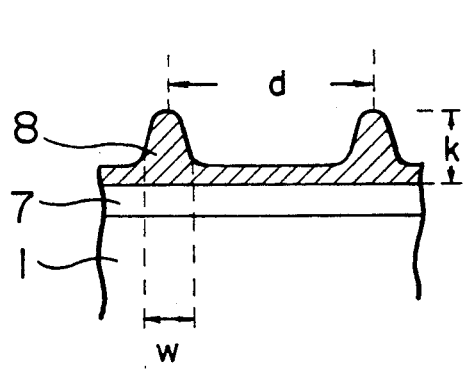
FIG. 5A shows schematically the sectional shape of sprayed particles forming the protective film in a cathode ray tube according to this invention and FIG. 5B shows that in a conventional antistatic cathode ray tube.
Figure 5B:
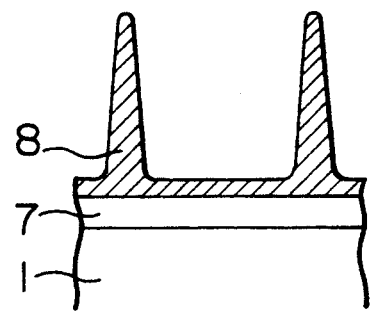
Figure 6:
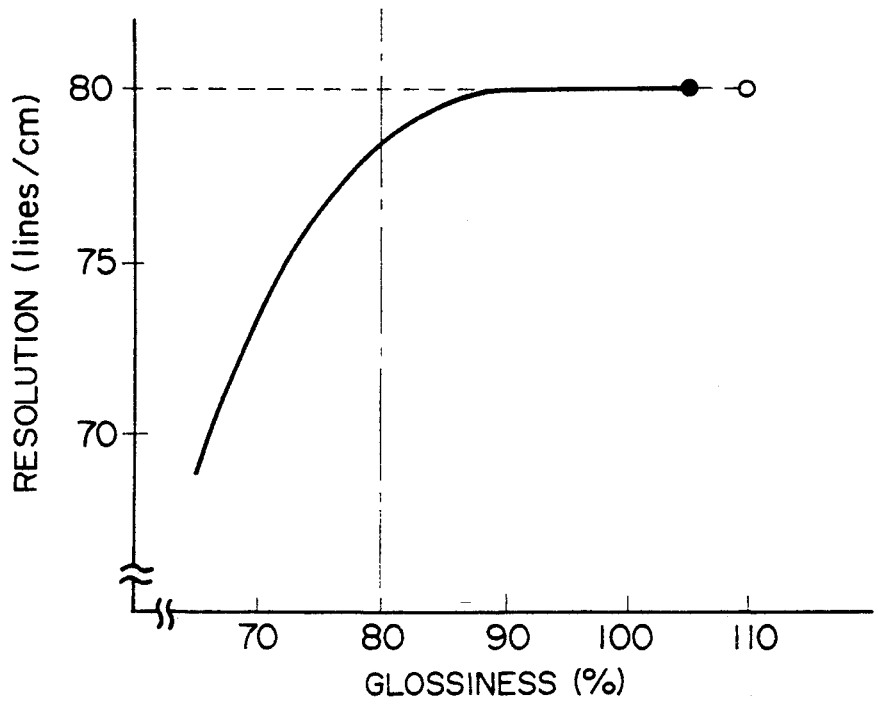
FIG. 6 is a graph showing the relation between glossiness and resolution.
Figure 7:
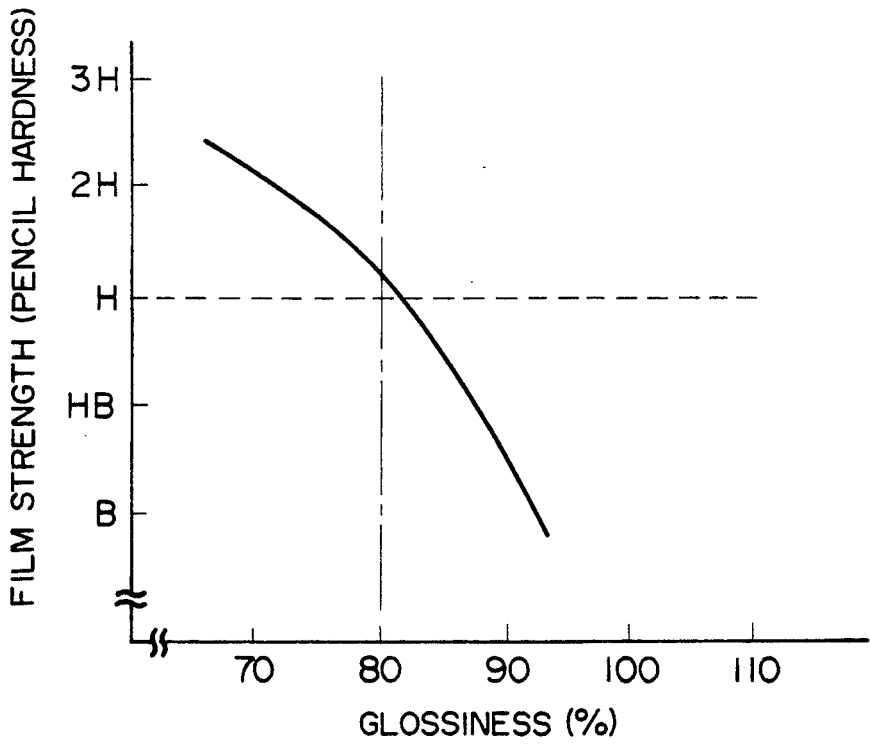
FIG. 7 is a graph showing the relation between glossiness and strength of protective film.

Here, the properties of protective film defined above will be explained more particularly. The protective film ($SiO_2$ film) formed by spray-coating has a surface configuration consisting of a plurality of "craters" each of which has a flat and circular bottom at the central part and is raised up at the periphery. FIG. 5A shows schematically the sectional shape of one particle of the film formed according to this invention while FIG. 5B shows that of a conventional protective film, both films being supposed to have the same film strength. In the case of FIG. 5B, as seen from the drawings, the rising at the periphery is higher than that in FIG. 5A, so that surface glossiness is lowered, resulting in low resolution and constrast. In the case of FIG. 5A, on the other hand, the peripheral rising is low and the whole surface is uniformly coated, so that surface glossiness is high, causing no reduction of resolution and constrast while maintaining high film strength.

In the present invention, the solid content of $SiO_2$ derived from ethyl silicate is defined to the range of 0.5 to 1.5%. This is for the reason that when the solid content is less than 0.5%, there can not be obtained a coating capable of maintaining desired film strength, and when the solid content exceeds 1.5%, the peripheral rising heightens to such a degree as to reduce surface glossiness.

The mixing ratio of the solvent mainly composed of ethanol and isopropanol is defined to the range of 75 to 90% for the reason that when the ratio of said solvent is less than 75%, both drying rate and gelling rate increase to discourage fusion of the sprayed particles to increase the number of individual particles. This also causes early solidification of particles and the peripheral rising of individual particles heightens to reduce surface glossiness. When the ratio of the solvent is higher than 90%, the coating thickness is reduced to lower film strength.

The amount of the catalyst and/or water necessary for hydrolysis in the composition is regulated within a range from 2 to 3% in the present invention. The reason is that when the amount thereof is less than 2%, $SiO_2$ remains inactive for forming a solid coating necessary for maintaining high film strength, and when said amount exceeds 3%, the progress of gelation is accelerated to consequently reduce surface glossiness.

The reason why the mixing ratio of drying rate regulator is defined to the range of 5 to 20% is that as in the case of solvent concentration, when the ratio of drying rate agent is less than 5%, surface glossiness is lowered, and when the ratio is higher than 20%, the coating thickness is reduced to lower film strength.

Regarding the properties of the protective film to be formed in this invention, it should be noted that when surface roughness Rz is less than 0.01 μm, the particle diameter is less than 10 μm and the number of particles within the specified section of the length of 0.1 mm is less than 0.5 (on the average), there can not be attained uniform coating over the whole surface, so that the desired coating strength can not be obtained. Also, when Rz is over 0.2 μm, the particle diameter is greater than 150 μm and the number of particles in the defined section is more than 5, although satisfactory coating strength can be obtained, surface glossiness becomes less than 80%.

As appreciated from the foregoing descriptions, the protective film obtained by applying the conditions specified in the present invention has a satisfactory surface thickness, a generally uniform and sufficient strength and a desired high degree of glossiness.

Thus, in accordance with the present invention, a cathode ray tube whose panel surface glossiness is higher than 80% and which has fine unevenness on the panel surface and is capable of maintaining a high level of resolution and contrast can be obtained by first forming a transparent electroconductive film (first layer) on the panel surface by spin-coating or spray-coating it with a coating composition comprising 0.5 to 5 wt % of at least one metal oxide selected from tin oxide, indium oxide and antimony oxide which have electroconductivity in themselves, 0.5 to 2 wt % of silicon oxide to be derived from alkyl silicate, [that is, an amount of alkyl silicate is adjusted so as to form 0.5 to 2 wt % of silicon oxide (hereinafter, the same thing is applicable)], 60 to 90 wt % of a solvent composed of ethanol and isopropanol, 1 to 15 wt % of a mixture of catalyst and water necessary for hydrolysis, and 5 to 20 wt % of a drying rate regulator, and then forming a protective film (second layer) on said electroconductive film by spraying thereto a coating solution containing 0.5 to 1.5 wt % of silicon oxide to be derived from alkyl silicate, 75 to 90 wt % of solvent composed of ethanol and isopropanol, 2 to 3 wt % of a mixture of catalyst and water necessary for hydrolysis, and 5 to 20 wt % of drying rate regulator.

The thus coated panel of cathode ray tube has a surface resistivity of $10^6$ to $10^{11} \Omega/\square$, which is notably low in comparison with surface resistivity (higher than $10^{12} \Omega/\square$) of non-treated panel, so that the coated panel surface has a high antistatic effect. Further, a markedly high film strength can be obtained by coating the entirety of transparent electroconductive film with the protective film.

It should be noted that when surface resistivity is less than $10^6\Omega/\square$, there is a danger that a person may receive an electric shock when he touches the panel surface inadvertently in operation. On the other hand, when surface resistivity is higher than $10^{12}\Omega/\square$, the time required for dissipating the static charge time is prolonged to make it substantially unable to effectuate the antistatic function of the coated surface.

Also, when forming a transparent electroconductive film by means of spray coating, contaminants such as dust on the panel surface are eliminated by the sprayed air stream, so that there is no risk of incurring surface defects due to contaminants which could pose a serious problem in case of using spin coating or dip coating method. Moreover, since the protective film is made up of an assembly of fine particles, there is no possibility of the film suffering from such defects as formation of interference color or non-uniformity of coloration, and control of producing conditions is easy, so that high-yield production is possible.

Further, interspersed presence of lobe-like projections on the transparent electroconductive film eliminates the possibility of causing coloration by interference of the film, which is seen in forming the conventional uniformly surfaced protective film.

Particularly, interspersed presence of lobe-like projections measuring 1 to 50 μm in width and 0.01 to 0.5 μm in height can prevent reduction of resolution and clearness of image due to diffuse reflection. A more detailed explanation on this matter will be given below.

Figure 3:
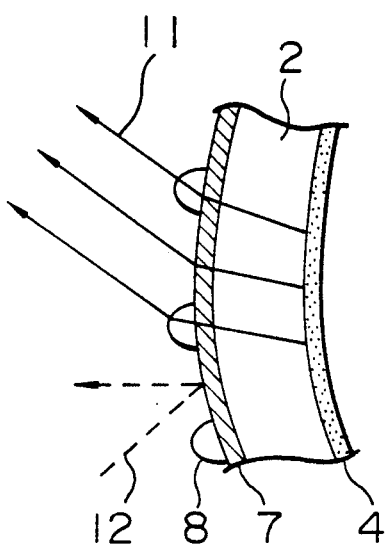
FIG. 3 is an enlarged sectional view of the principal parts of front panel of the cathode ray tube shown in FIG. 2.
Figure 4:
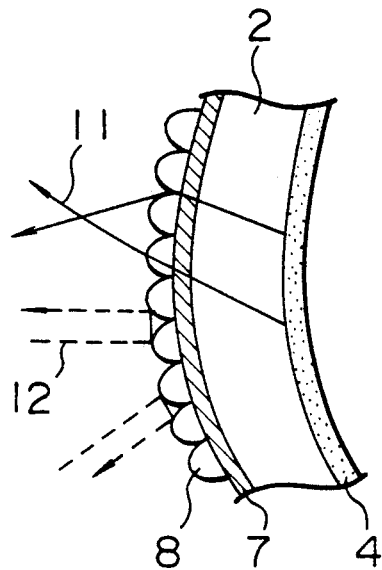
FIG. 4 is an enlarged sectional view of the principal parts of front panel of a conventional antistatic cathode ray tube.

A cathode ray tube is taken up here as an example of structure to be treated. FIG. 3 in the accompanying drawings is an enlarged sectional view of the principal parts of the front panel of a cathode ray tube coated according to the method of the present invention, and FIG. 4 shows a similar view of the front panel of a cathode ray tube coated according to the conventional techniques.

A fluorescent layer 4 is formed on the inside of front panel 2 of a cathode ray tube. This fluorescent layer 4 generates fluorescent light 11 upon receiving electron beams issued from an electron gun (not shown), and such fluorescent light is released out to form an image. On the other hand, external light 12 reflects at the panel surface to become reflected light. In the case of the cathode ray tube having a coat with conventional dense makeup (FIG. 4), fluorescent light 11 which has reached the panel surface from its inside is refracted in a complex way in the protective film, which makes the image contour blurred to reduce resolution. External light 12 also reflects at all angles in the protective film, so that the picture of external light is blurred, producing a so-called non-glare state. But the panel surface as a whole presents a glittering appearance and a white cloudy surface condition. Use of such cathode ray tube, therefore, is unsatisfactory for users who require clear-cut pictures.

On the other hand, in the case of the cathode ray tube having a surface coat with interspersed lobe-like projections according to the present invention (FIG. 3), fluorescent light 11 emitted from fluorescent layer 4 is scarcely refracted in the protective film section, so that a clear image contour can be obtained. External light 12 also mostly reflects regularly, making no diffuse reflection, so that there is produced no glittering appearance or a white cloudy surface condition as in the case of conventional cathode ray tube, and therefore a clear image can be obtained. Further, the presence of said lobe-like projecting particles in the protective layer ensures the required function of protective layer against mechanical and chemical actions, making it possible to form an antistatic film with high film strength. It is to be noted that when the width of the lobe is less than 1 μm and when its height is less than 0.01 μm, there can not be obtained the desired mechanical and chemical strength. Also, when the width exceeds 50 μm and the height exceeds 0.5 μm, the resolution and image clearness provided by the present invention become unobtainable.

EXAMPLES

More detailed descriptions of the cathode ray tube according to the present invention will be given below by showing the examples thereof.

EXAMPLE 1

An alcohol solution containing tin oxide ($SnO_2$) and ethyl silicate ($Si(OC_2H_5)_4$, which are electroconductive per se, was spin-coated on the front panel surface of a cathode ray tube to form a transparent electroconductive film. Then a solution comprising 80% of ethanol, 7% of isopropanol, 2.5% of catalyst, 1.0% (as solid content of $SiO_2$) of ethyl silicate and 9.5% of diacetone alcohol was spray-coated on the transparent electroconductive film and baked at 160° C. for 30 minutes.

The resultantly obtained front panel surface of cathode ray tube had a surface glossiness of 90%, a resolution of 78 lines/cm and a pencil hardness of 3H.

EXAMPLE 2

A transparent electroconductive film was formed on the front panel surface of a cathode ray tube in the same way as Example 1, and then a solution containing 70% of ethanol, 8% of isopropanol, 2% of catalyst, 1.0% (as solid content of $SiO_2$) of ethyl silicate, 10% of diacetone alcohol and 9% of ethyl cellosolve was spray-coated on the transparent electroconductive film and baked at 160° C. for 30 minutes.

The front panel surface of the cathode ray tube obtained in the manner described above had a surface glossiness of 95%, a resolution of 80 lines/cm and a pencil hardness of 2H.

COMPARATIVE EXAMPLE 1

A transparent electroconductive film was formed on the front panel surface of cathode ray tube in the same way as Example 1, and then a solution comprising 80% of ethanol, 8% of isopropanol, 9% of catalyst and 3% (as solid content of $SiO_2$) of ethyl silicate was spray-coated on the electroconductive layer and baked at 160° C. for 30 minutes. In performing the spray-coating, the spraying conditions were adjusted so that the surface glossiness would become 80% or higher.

The thus formed front panel surface of the cathode ray tube has a surface glossiness of 80%, a resolution of 75 lines/cm and a pencil hardness below H.

COMPARATIVE EXAMPLE 2

A transparent electroconductive film was formed on the front panel surface of a cathode ray tube in the same way as Example 1, and this film, without forming a protective film thereon, was subjected to baking at 160° C. for 30 minutes.

The thus formed front panel surface of the cathode ray tube had a glossiness of 110%, a resolution of 80 lines/cm and a pencil hardness of 2B.

The results of the above Examples and Comparative Examples are shown collectively in Table 1.

TABLE 1

|  | Example 1 | Example 2 | Comp. Example 1 | Comp. Example 2 |
|---|---|---|---|---|
| Solution composition |  |  |  |  |
| Ethanol | 80 | 70 | 80 |  |
| Isopropanol | 7 | 8 | 8 |  |
| Catalyst | 2.5 | 2 | 9 |  |
| $SiO_2$ | 1.0 | 1.0 | 3.0 |  |
| Diacetone alcohol | 9.5 | 10 | — |  |
| Ethyl cellosolve | — | 9 | — |  |
| Film properties |  |  |  |  |
| Glossiness (%) | 90 | 95 | 80 | 110 |
| Resolution (lines/cm) | 78 | 80 | 75 | 80 |
| Pencil hardness | 3H | 2H | H≧ | 2B |

As seen from Table 1, the cathode ray tube constituted by using the techniques of the present invention can solve the problems of the prior art. Namely, the front panel surface of the present cathode ray tube has sufficient electroconductivity, a glossiness of 80% or above and a pencil hardness of H or above.

Thus, in accordance with the present invention, there is provided a glare type cathode ray tube which can well withstand practical handling and use.

EXAMPLES 3 AND 4

A method of producing an antistatic type cathode ray tube shown in FIG. 1 is described below. FIG. 1 is a sectional view illustrating schematically the makeup of an antistatic cathode ray tube 1 according to this invention. In the drawing, reference numeral 2 designates panel, 3 funnel, 4 fluorescent layer, 5 shadow mask, 6 electron gun, and 9 antistatic film consisting of a transparent electroconductive film 7 and a surface protective film 8.

First, the front surface of the panel 2 of cathode ray tube 1 was cleaned by using a polishing agent such as cerium oxide ($CeO_2$) and an alkali detergent and then subjected to spray-coating with a transparent electroconductive film forming solution and then with a surface protective film forming solution, the compositions of said both solutions being shown in Table 2 in the columns of Example 3 and Example 4, respectively, to form a transparent electroconductive film 7 and a surface protective film, and the coat was baked at 160° C. for 30 minutes to form an antistatic film 9 having fine surface unevenness.

Glossiness of the external surface of panel was measured for each specimen after cooling by using a glossmeter. As shown in the section of Properties in Table 2, the specimens of Examples 3 and 4 showed glossiness of 95% and 80% and surface resistivity of $19^9 \Omega/\square$ and $10^7 \Omega/\square$, respectively. Also, both specimens had a resolution of 80 lines/cm or above and a pencil hardness of 6H. On the other hand, the specimen coated with a transparent electroconductive film alone (Referential Example 3 in Table 2), although almost equal to the specimens of Examples 3 and 4 in glossiness, surface resistivity and resolution, was excessively low in pencil hardness (4B). In the case of the specimen in which the surface protective film was formed by using a film forming solution containing no drying rate regulator and increased in content of catalyst and water (Referential Example 4 in Table 2), the specimen was substantially equal to Examples 3 and 4 in surface resistivity and pencil hardness, but surface glossiness of this specimen was as low as 50%, and it also showed a low resolution of 75 lines/cm.

Examination was also made on attenuation of static electricity on the panel surface at the time of switching-off of a television receiver using a cathode ray tube with a 29-inch wide screen. The test was conducted by setting the measuring position of static electricity on the panel surface at a point 50 mm away from the center of panel surface under the environmental conditions of 20 to 23° C. and 30 to 35% RH. The results showed that in the case of the cathode ray tube which had no coating treatment on the panel surface, surface potential remained almost unchanged even after the lapse of 300 seconds from switching-off, whilst in the case of the cathode ray tubes of Examples 3 and 4 and Referential Examples 3 and 4 in Table 2, surface potential became Zero almost instantaneously upon switching-off, which attests to an excellent antistatic effect of the panel surface coating.

TABLE 2

|  | Example 3 | Example 4 | Ref. Example 3 | Ref. Example 4 |
|---|---|---|---|---|
| Transparent electroconductive film forming solution |  |  |  |  |
| Electroconductive material | 1.0 | 2.0 | 1.0 | 1.0 |
| Silicon oxide | 0.5 | 1.0 | 0.5 | 0.5 |
| Solvent | 83.5 | 77 | 83.5 | 83.5 |
| Catalyst and water | 5 | 10 | 5 | 5 |
| Drying rate regulator | 10 | 10 | 10 | 10 |
| Surface protective film forming solution |  |  |  |  |
| Silicon oxide | 1.0 | 1.0 | — | 3.0 |
| Solvent | 87 | 87 | — | 88 |
| Catalyst and water | 2 | 2 | — | 9 |
| Drying rate regulator | 10 | 10 | — | — |
| Properties |  |  |  |  |
| Glossiness (%) | 98 | 80 | 100 | 50 |
| Surface resistivity ($\Omega/\square$) | $10^9$ | $10^7$ | $10^7$ | $10^7$ |
| Resolution (lines/cm) | >80 | >80 | >80 | 75 |
| Pencil hardness | 6H | 6H | 4B | 6H |

(In the above table, figures in the sections of solution compositions are % by weight.)

It is clear from Table 2 that the cathode ray tubes constituted according to the techniques of the present invention have an excellent antistatic effect as well as satisfactory resolution and contrast characteristics.

In the foregoing Examples, there have been shown and described the embodiments of the invention comprising a two-layer coating film structure (surface protective film on transparent electroconductive film) on the panel surface, but it will be readily understood that the similar results can be obtained by forming both films alternately in plural layers or by spray-coating the panel surface with both film forming solutions simultaneously, as far as the operations are performed under the specified conditions of the present invention.

Also, although a composite coating film was formed on the front panel surface of a finished cathode ray tube in the above-described embodiments of the invention, it will be clear that the same effect can be obtained by first forming a composite film on the front surface of the panel part for a cathode ray tube and then forming on the backside thereof a fluorescent screen, etc., to produce a cathode ray tube.

EXAMPLE 5

Figure 2:
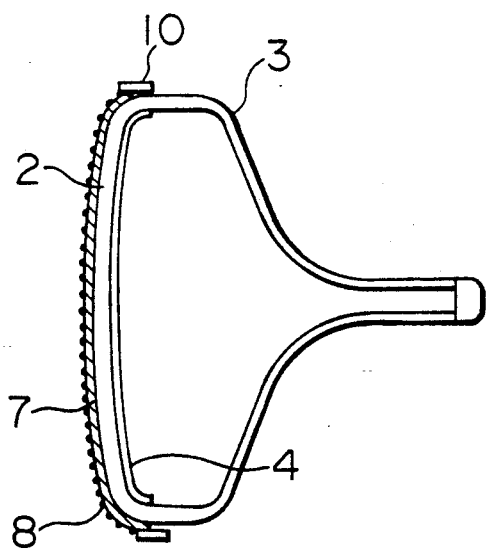
FIG. 2 is a sectional view showing another embodiment of antistatic cathode ray tube according to the present invention.

FIG. 2 is a sectional view illustrating schematically the structure of a cathode ray tube constituted according to this invention. It comprises a panel 2, a funnel 3, a fluorescent layer 4 coated on the inside of the panel, a transparent electroconductive film 7 coating the front face of the panel, a protective layer of particles 8 formed on said film 7, and a reinforcing band 10. In the drawing, there are shown only those parts which are necessary for the explanation of this embodiment of the invention.

First, transparent electroconductive layer 7 was spray-coated on the external surface of panel 2, and then protective layer 8 was further spray-coated on the film 7 and baked at 200° C. for 30 minutes to obtain a finished cathode ray tube. Transparent electroconductive film 7 was formed by using a coating solution comprising 1 wt % of electroconductive material, 0.5 wt % of silicon oxide to be derived from alkyl silicate, 83.5 wt % of solvent mainly composed of ethanol and isopropanol, 5 wt % of a mixture of catalyst and water, and 10 wt % of drying rate regulator (diacetone alcohol). For forming protective layer 8, there was used a solution comprising 1 wt % of silicon oxide derived from alkyl silicate, 87 wt % of solvent mainly composed of ethanol and isopropanol, 2 wt % of a mixture of catalyst and water, and 10 wt % of drying rate regulator (ethyl cellosolve).

The protective layer 8 formed in the manner described above was comprised of a multiplicity of interspersed fine lobe-like projections having a width of about 10 μm and a height of 0.05 μm.

The above specimen and a specimen provided with a transparent electroconductive film alone were subjected to a 50-run rubbing test under a load of 1 kg by using a rubber eraser (Lion-5030, trade name). As a result, the change of gloss value in the former was less than 3%, while that in the latter was greater than 10%. This indicates that the former specimen has sufficient film strength for practical use.

Also, in a picture forming test, the specimen could show a clear contour of image and was capable of forming a picture with high resolution.

As described above, by using the techniques of this invention for forming the front panel structure of a cathode ray tube, that is, by first forming on the substrate surface a transparent electroconductive coating film mainly composed of inorganic oxides which are electroconductive per se, and then further forming thereon a protective layer made of transparent inorganic oxides and having a multiplicity of interspersed fine lobe-like projections having a width of 1 to 50 μm and a height of 0.01 to 0.5 μm, it is possible to solve the problems of the prior art and to provide a cathode ray tube panel structure having a transparent electroconductive film which can be formed even by low-temperature baking, has a high film strength and very satisfactory resolution and also enables formation of very clear image on the screen.

What is claimed is:

1. A cathode ray tube having a front panel and a two-layer composite film provided on said front panel and comprising a transparent electroconductive film formed on said front panel and a protective film formed on said electroconductive film; a surface of said front panel having a plurality of crater shaped particles each having a diameter of 10 to 150 μm and a raised lobe-like peripheral projection having a width of 1 to 50 μm and a height of 0.01 to 0.5 μm, wherein said surface has a surface glossiness of 80% or above when measured according to JIS Z-8741 Method 2 and a pencil hardness of 1H or above.

2. A cathode ray tube according to claim 1, whose surface electric resistivity is $10^6$ to $10^{11} \Omega/\square$.

3. A cathode ray tube according to claim 1, wherein said transparent electroconductive film is formed on the front panel by coating a surface of said front panel with a coating composition containing at least one of metal oxides selected from tin oxide ($SnO_2$), indium oxide ($In_2O_3$) and antimony oxide ($Sb_2O_3$), and an alkyl silicate ($Si(OR)_4$ wherein R is an alkyl group), and wherein said protective film is formed on said electroconductive film by coating it with a coating compound containing $Si(OR)_4$.

4. A cathode ray tube according to claim 3, wherein the transparent electroconductive film is formed by spray- or spin-coating the front panel surface with a coating composition comprising 0.5 to 5% by weight at of least one metal oxide selected from tin oxide, indium oxide and antimony oxide which are electroconductive per se, 0.5 to 2% by weight of silicon oxide to be derived from alkyl silicate, 60 to 90% by weight of a solvent composed of ethanol and isopropanol, 1 to 15% by weight of a mixture of a catalyst necessary for hydrolysis of said silicate and water, and 5 to 20% by weight of a drying rate regulator, and then the protective film is formed on said electroconductive film by spray-coating it with a coating composition comprising 0.5 to 1.5% by weight of silicon oxide derived from alkyl silicate, 75 to 90% by weight of a solvent composed of ethanol and isopropanol, 2 to 3% by weight of a mixture of a catalyst necessary for hydrolysis and water, and 5 to 20% by weight of a drying rate regulator and wherein said transparent electroconductive film and said protective film are baked at a temperature not exceeding 200° C.

* * * * *